United States Patent
Park et al.

(10) Patent No.: US 7,592,540 B2
(45) Date of Patent: Sep. 22, 2009

(54) POLYMER ELECTROLYTE AND DYE-SENSITIZED SOLAR CELL COMPRISING THE POLYMER ELECTROLYTE

(75) Inventors: Joung-Won Park, Suwon-si (KR);
Kang-Jin Kim, Suwon-si (KR);
Seung-Hoon Kal, Suwon-si (KR);
Wha-Sup Lee, Suwon-si (KR);
Byong-Cheol Shin, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 457 days.

(21) Appl. No.: 11/433,462

(22) Filed: May 15, 2006

(65) Prior Publication Data
US 2006/0254640 A1    Nov. 16, 2006

(30) Foreign Application Priority Data
May 16, 2005 (KR) .................. 10-2005-0040524

(51) Int. Cl.
*H01L 31/00* (2006.01)
*H01L 21/00* (2006.01)
*H01M 6/30* (2006.01)
*H01M 6/14* (2006.01)

(52) U.S. Cl. .................. 136/263; 136/256; 429/303; 429/111; 429/300; 438/57; 438/82; 438/85

(58) Field of Classification Search .................. 136/263, 136/256; 429/303, 111, 300; 438/57, 82, 438/85
See application file for complete search history.

(56) References Cited

U.S. PATENT DOCUMENTS
5,693,432 A    12/1997    Matsumoto
(Continued)

FOREIGN PATENT DOCUMENTS
EP        0720189    *    3/1996
(Continued)

OTHER PUBLICATIONS
Mao et al., "A Plasticized Polymer-Electrolyte-Based Photoelectrochemical Solar Cell", J. Electrochem Soc., vol. 145, No. 1, Jan. 1998, pp. 121-124.*
(Continued)

*Primary Examiner*—Nam X Nguyen
*Assistant Examiner*—Thanh-Truc Trinh
(74) *Attorney, Agent, or Firm*—Stein McEwen, LLP

(57) ABSTRACT

A polymer electrolyte composition for a dye-sensitized solar cell, a polymer electrolyte, a dye-sensitized solar cell employing the polymer electrolyte, and a method for preparing the same. The polymer electrolyte composition for a dye-sensitized solar cell includes: a mono-functional or multi-functional monomer having at least one ethylene glycol in a side chain; a photoinitiator; a lithium salt; and an organic solvent. The polymer electrolyte suppresses the volatilization of a redox electrolyte and provides stable photoelectrochemical properties against environmental changes, such as a rise in the external temperature of a solar cell. The dye-sensitized solar cell includes: first and second electrodes facing each other; a dye-adsorbed porous film interposed between the first and second electrodes; and the polymer electrolyte interposed between the first and second electrodes. The dye-sensitized solar cell has a high voltage and high photoelectric conversion efficiency.

29 Claims, 11 Drawing Sheets

U.S. PATENT DOCUMENTS

| | | | |
|---|---|---|---|
| 5,925,283 | A | 7/1999 | Taniuchi |
| 6,335,481 | B1 * | 1/2002 | Watanabe .................. 136/263 |
| 6,376,765 | B1 * | 4/2002 | Wariishi et al. ............. 136/263 |
| 6,756,537 | B2 | 6/2004 | Kang et al. |
| 2001/0004901 | A1 * | 6/2001 | Yamanaka et al. .......... 136/263 |
| 2006/0162771 | A1 | 7/2006 | Inoue et al. |

FOREIGN PATENT DOCUMENTS

| | | |
|---|---|---|
| EP | 0 720 189 | 7/1996 |
| EP | 0 823 744 | 2/1998 |
| EP | 1 526 159 | 4/2005 |
| JP | 2001-24253 | 1/2001 |
| KR | 2003-56957 | 8/2003 |
| KR | 2004-89569 | 10/2004 |
| KR | 2005-32245 | 4/2005 |
| WO | WO 2004/011555 | 2/2004 |
| WO | WO 2004/075333 | 9/2004 |

OTHER PUBLICATIONS

Notice to Submit Response issued May 26, 2006 by the Korean Intellectual Property Office re: Korean Application No. 2005-40524 (4 pp).

Search Report issued in European Patent Application No. 03771315.3 on Aug. 10, 2006.

Ana F. Nogueira, James R. Durrant, and Marco A. DePaoli. "Dye-Sensitized Nanocrystalline Solar Cells Employing a Polymer Electrolyte," *Advanced Materials* vol. 13, No. 11, Jun. 5, 2001 (pp. 826-830).

Ana F. Nogueira and Marco A. DePaoli, Ivan, Montanari, Richard Monkhouse, Jenny Nelson and James R. Durrant, "Electron Transfer Dynamics in Dye Sensitized Nanocrystalline Solar Cells Using a Polymer Electrolyte," *Journal of Physical Chemistry B* vol. 105 No. 31, 2001 (pp. 7517-7524).

* cited by examiner

POLYMER ELECTROLYTE AND DYE-SENSITIZED SOLAR CELL COMPRISING THE POLYMER ELECTROLYTE

CROSS-REFERENCE TO RELATED APPLICATIONS

This application claims the benefit of Korean Application No. 2005-40524, filed May 16, 2005, in the Korean Intellectual Property Office, the entire disclosure of which is incorporated herein by reference.

BACKGROUND OF THE INVENTION

1. Field of the Invention

Aspects of the present invention relate to a dye-sensitized solar cell, and more particularly, to a dye-sensitized solar cell with improved photoelectrical conversion efficiency by using a polymer electrolyte.

2. Description of the Related Art

Dye-sensitized solar cells are photoelectrochemical solar cells using photosensitive dye molecules capable of generating electron-holes pairs by absorbing visible rays and an oxide semiconductor electrode that transfers the generated electrons and is formed of titanium oxide.

In a conventional silicon solar cell, the absorption of solar energy and the generation of an electromotive force by the separation of electron-hole pairs occur simultaneously in a silicon semiconductor. Meanwhile, in a dye-sensitized solar cell, the absorption of solar energy and the transfer of charges occur separately. In particular, in the dye-sensitized solar cell, a dye absorbs the solar energy, and a semiconductor electrode transfers the charges.

Such dye-sensitized solar cells have low manufacturing costs, are environmentally friendly, and can be manufactured to be flexible. However, due to low energy conversion efficiency, there is a limit to the practical application of dye-sensitized solar cells.

The energy conversion efficiency of a solar cell is in proportion to the amount of electrons generated by the absorption of solar light. The energy conversion efficiency can be increased by increasing the absorption of solar light, by increasing the absorbed amount of dye to generate more electrons, or by preventing the loss of excited electrons by the recombination with holes.

To increase the absorption of a dye in a unit area, a method of preparing nano-sized oxide semiconductor particles, a method of increasing the reflectivity of a platinum electrode to increase the absorption of solar light, a method of adding micro-sized optical scatterers of semiconductor oxide, etc., have been suggested.

A solar cell presented by Gratzel et al. from Switzerland in 1991 is a representative example of conventional dye-sensitized solar cells. The solar cell presented by Gratzel et al. is a photoelectrochemical solar cell using photosensitive dye molecules and an oxide semiconductor composed of titanium dioxide nanoparticles. The manufacturing costs of the solar cell are lower than silicon solar cells. Currently available dye-sensitized solar cells include a nanoparticle oxide semiconductor cathode, a platinum anode, a dye coated on the cathode, and an oxidation/reduction electrolyte using an organic solvent. In such a conventional dye-sensitized solar cell comprising an electrolyte prepared using an organic solvent, the organic solvent of the electrolyte is likely to volatilize when the external temperature of the solar cell rises due to solar light. Thus, the long-term stability and practicality of the dye-sensitized solar cell deteriorate.

Korean Patent Publication No. 2003-65957 discloses a dye-sensitized solar cell containing polyvinylidene fluoride-containing gel type polymer electrolyte in which the volatility of an electrolyte solvent is reduced to increase the photoelectric conversion efficiency. However, the energy conversion efficiency of the solar cell is lower than when an organic solvent-containing electrolyte is used. Therefore, there is a need to develop a polymer electrolyte with long-term stability and high energy conversion efficiency.

SUMMARY OF THE INVENTION

Aspects of the present invention provide a polymer electrolyte composition for a dye-sensitized solar cell with improved energy conversion efficiency and stable photoelectrochemical properties against environmental changes, such as a rise in the external temperature of the solar cell, by minimizing the volatilization of a solvent of a polymer electrolyte.

Aspects of the present invention provide a dye-sensitized solar cell employing the polymer electrolyte.

According to an aspect of the present invention, there is provided the polymer electrolyte composition of the dye-sensitized solar cell, the composition comprising: a mono-functional or multi-functional monomer having at least one ethylene glycol in a side chain; a photoinitiator; a lithium salt; and an organic solvent.

According to another aspect of the present invention, there is provided the polymer electrolyte for the dye-sensitized solar cell that is obtained by polymerizing the above-described polymer electrolyte composition.

According to another aspect of the present invention, there is provided a dye-sensitized solar cell comprising: first and second electrodes facing each other; a dye-adsorbed porous film interposed between the first and second electrodes; and the above-described polymer electrolyte interposed between the first and second electrodes.

According to another aspect of the present invention, there is provided a method of manufacturing a dye-sensitized solar cell, the method comprising: preparing a first electrode and forming a porous film on an upper surface of the first electrode; defining a cell space by covering the porous film with glass disposed a predetermined distance above the porous film; injecting a polymer electrolyte composition including a mono-functional or a multi-functional monomer having at least one ethylene glycol in a side chain, a photoinitiator, a lithium salt, and an organic solvent into the cell space between the porous film and the glass and polymerizing the polymer electrolyte composition to obtain a polymer electrolyte; removing the glass and forming a second electrode a predetermined distance above the porous film and the polymerized polymer electrolyte; and forming a fine hole in the second electrode and injecting a liquid electrolyte through the fine hole.

The polymer electrolyte according to an aspect of the present invention provides stable photoelectrochemical properties against environmental changes and can be used in a dye-sensitized solar cell having a high voltage and high efficiency.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
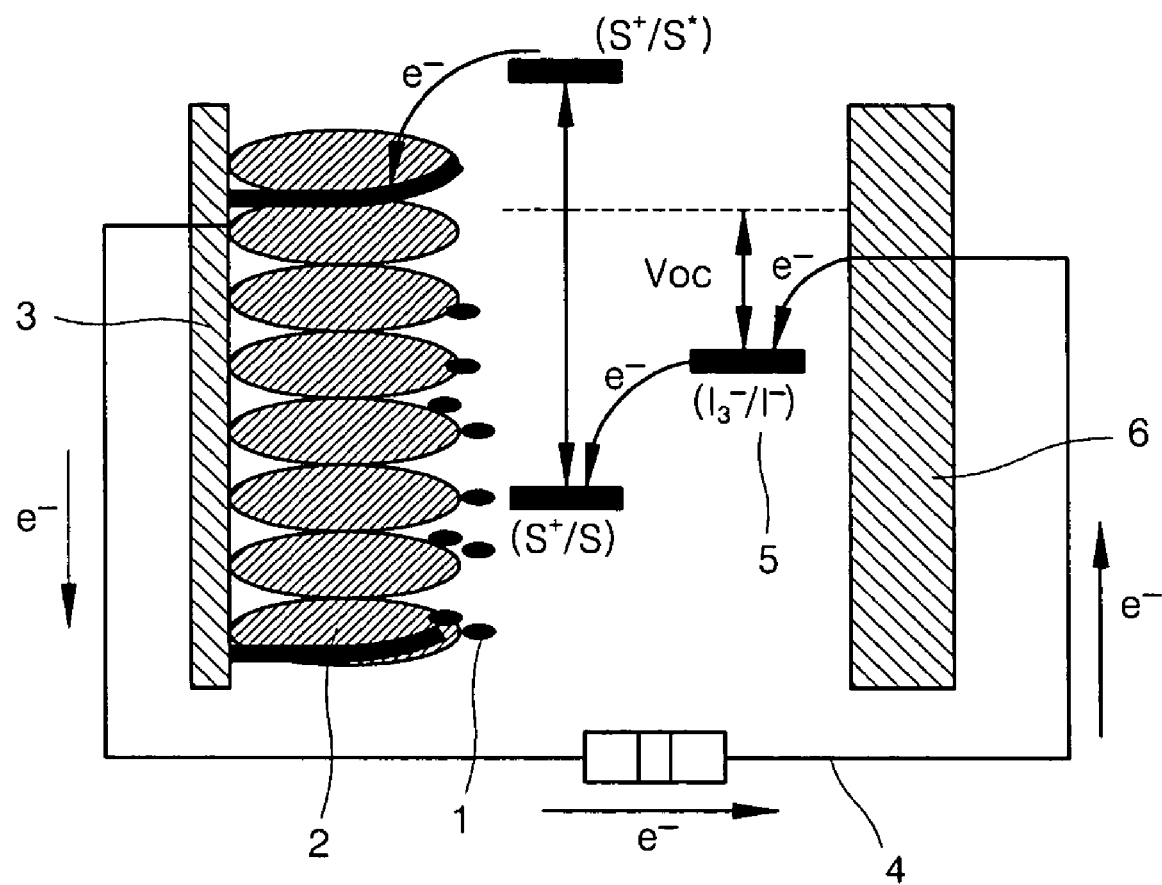
FIG. 1 is a schematic view illustrating the operating principles of a common dye-sensitized solar cell.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates the operating principles of a common dye-sensitized solar cell. Referring to FIG. 1, as dye molecules 1 absorb solar light, electrons of the dye molecules transit from a base state to an excited state and form electron-hole pairs. The electrons in the excited state enter a conduction band at the interface between titanium oxide particles 2 and are transferred to a transparent conductor (indium or fluorine-doped tin oxide) 3 through the interface of the transparent conductor and to a Pt counter electrode 6 through an external circuit 4. On the other hand, the dye oxidized as a result of the transition of electrons is reduced by iodine ions ($I^-$) of a redox couple 5 in an electrolyte, and the oxidized iodine ions ($I_3^-$) are reduced through the reaction with the electrons reaching the interface of the Pt counter electrode to achieve charge neutrality. As described above, unlike p-n junction type Si solar cells, the dye-sensitized solar cell operates through the interfacial reactions based on the electrochemical principles through the interfacial reactions. Therefore, there is a technical requirement for interfacial characteristic improvement.

Aspects of the present invention provide a polymer electrolyte composition for a dye-sensitized solar cell that includes a mono-functional or multi-functional monomer having at least one ethylene glycol in a side chain, a photo-initiator, a lithium salt, and an organic solvent.

While not required in all aspects, in an embodiment of the present invention, the amount of the mono-functional or multi-functional monomer is in a range of 1-10 parts by weight based on 100 parts by weight of the polymer electrolyte composition. Generally, when the amount of the mono-functional or multi-functional monomer exceeds 10 parts by weight based on 100 parts by weight of the polymer electrolyte composition, a liquid electrolyte cannot pass through the polymerized electrolyte. Generally, when the amount of the mono-functional or multi-functional monomer is less than 1 part by weight, iodide ions $I_3^-$ cannot be sufficiently blocked.

Examples of the mono-functional or multi-functional monomer that can be used in embodiments of the present invention include alkyl or alkoxy(meth)acrylates, such as methyl(meth)acrylate, ethyl(meth)acrylate, ethylhexyl ether acrylate, methoxyethyl(meth)acrylate, ethoxyethyl (meth)acrylate, etc., vinyl acetates, such as vinylpivalate, vinylpropionate, etc., vinylpyridine, vinylpyrrodidone, polyethyleneglycol diacrylate, polyethyleneglycol dimethacrylate, diethylene glycol-2-ethylhexyl ether acrylate, vinyl acrylate, trimethylolpropane tri(meth)acrylate and a derivative thereof, pentaerythritol tetra(meth)acrylate and a derivative thereof, dipentaerythriotol hexa(meth)acrylate and a derivative thereof, etc.

In addition, while not required in all aspects, the mono-functional or multi-functional monomer has a weight average molecular weight of 100-1,000. When the mono-functional or multi-functional monomer has a weight average molecular weight greater than 1,000, the melting viscosity is generally too high. When the mono-functional or multi-functional monomer has a weight average molecular weight smaller than 100, desirable polymer characteristics generally cannot be obtained. The flowability of a side chain responsible for the plasticizing function is significant.

While not required in all aspects, in an embodiment of the present invention, the mono-functional or multi-functional monomer having at least one ethylene glycol in a side chain is diethylene glycol-2-ethylhexyl ether acrylate. The amount of the mono-functional or multi-functional monomer may be in a range of 1-10 parts by weight based on 100 parts by weight of the polymer electrolyte composition.

Figure 2A:
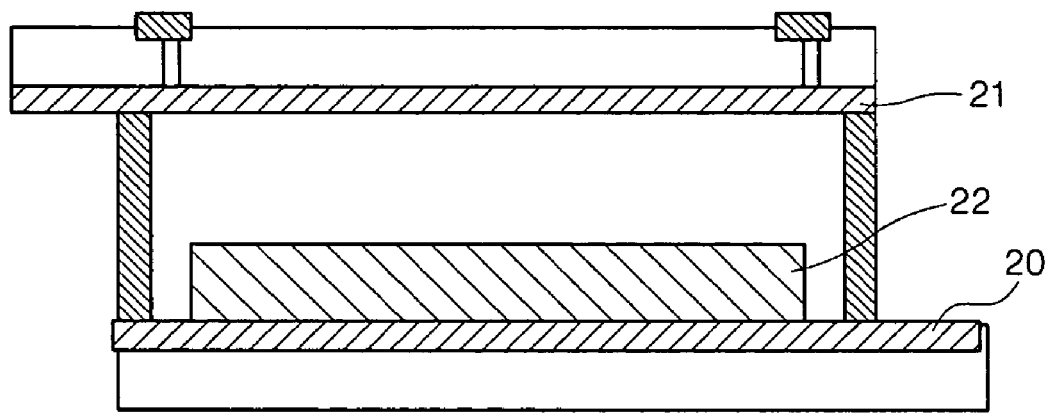
FIG. 2A is a view illustrating a structure of a conventional dye-sensitized solar cell.

FIG. 2A illustrates the basic structure of a conventional dye-sensitized solar cell. The conventional dye-sensitized solar cell has a sandwich structure with two planar electrodes, i.e., a first electrode 20 and a second electrode 21, facing each other. A porous film 22 is coated on a surface of the first electrode 20. A photosensitive dye to excite electrons by absorbing visible light is adsorbed onto a surface of the porous film 22. The first and second electrodes 20 and 21 are bound together and supported by supports. A space between the first and second electrodes is filled with an electrolyte to induce oxidation and reduction.

Figure 2B:
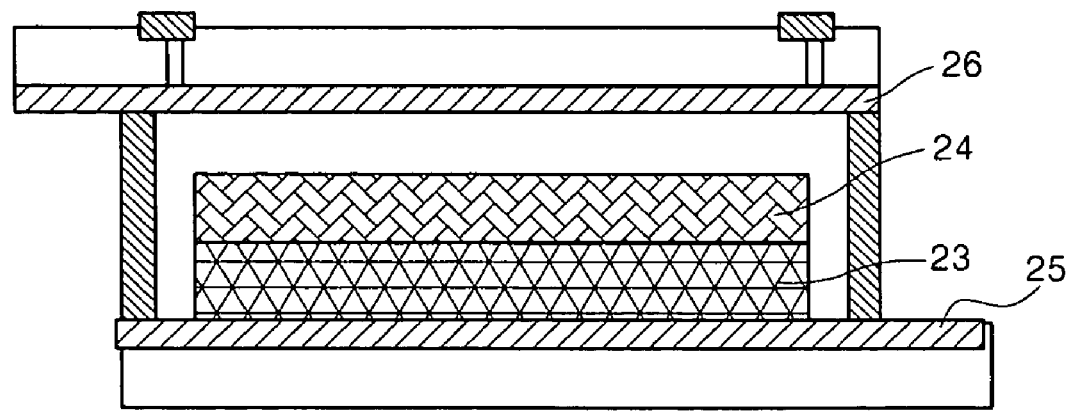
FIG. 2B is a view illustrating a structure of a dye-sensitized solar cell according to an embodiment of the present invention.

FIG. 2B illustrates a structure of a dye-sensitized solar cell according to an embodiment of the present invention. A polymer layer 24 containing a liquid electrolyte is formed on and in the porous film 23. The polymer layer 24 prevents vaporization of the liquid electrolyte on and in the porous film 23 and holds the liquid electrolyte.

Although the polymer electrolyte is illustrated as being between the porous film 24 and the second electrode 25 in FIG. 2B, this structure is for explaining a process of manufacturing the solar cell, and thus the present invention is not limited thereto. Alternatively, the electrolyte may fill the space between the first and second electrodes 25 and 26 and be uniformly distributed in the porous film.

The electrolyte accepts electrons generated by the oxidation/reduction of $I^{-1}/I^{-3}$ in a counter electrode and transfers the electrons to the dye. The open-circuit voltage is determined according to a difference between the Fermi energy level of the porous film and a redox level of the electrolyte.

While not required in all aspects, in an embodiment of the present invention, the photoinitiator is at least one selected from the group consisting of benzoylperoxide, azobisisobutyronitrile, benzophenone, acetophenone, benzoin methyl ether, and benzoin ethyl ether. The amount of the photoinitiator may be in a range of 0.05-0.2 parts by weight based on 100 parts by weight of the polymer electrolyte composition.

While not required in all aspects, the lithium salt in the polymer electrolyte composition according to an embodiment of the present invention is one selected from the group of $LiPF_6$, $LiClO_4$, $LiBF_4$, $LiCF_3SO_3$, $LiN(CF_3SO_2)_2$, $LiC(CF_3SO_2)_3$, $LiSCN$, $LiSbF_6$, $LiAsF_6$, and a combination of two or more. The concentration of the lithium salt may be in a range of 0.4-1.5M.

While not required in all aspects, the polymer electrolyte composition according to an embodiment of the present invention further includes an organic solvent. The organic solvent may be at least one selected from the group consisting of acetonitrile (AN), ethyleneglycol, buthanol, isobutylalcohol, isopentylalcohol, isopropylalcohol, ethylether, dioxane, tetrahydrobutane, tetrahydrofuran, n-butylether, propylether, isopropylether, acetone, methylethylketone, methylbutylketone, methyl isobutylketone, ethylene carbonate (EC), diethyl carbonate (DEC), propylene carbonate (PC), dimethyl carbonate (DMC), ethyl methyl carbonate (EMC), γ-butylrolactone (GBL), N-methyl-2-pyrrolidone, and 3-methoxypropionitrile (MP), but is not limited thereto.

While not required in all aspects, the amount of the organic solvent is in a range of 10-90 parts by weight based on 100 parts by weight of the polymer electrolyte composition. A separate solvent is unnecessary when, for example, an imidazolium-based iodide in liquid state, is used.

While not required in all aspects, in an embodiment of the present invention, the polymer electrolyte composition further includes a carbonate-based plasticizer, for example, ethylene carbonate, propylene carbonate, etc.

While not required in all aspects, in an embodiment of the present invention, the polymer electrolyte composition for a dye-sensitized solar cell includes diethylene glycol-2-ethylhexyl ether acrylate, benzoin ethyl ether, $LiClO_4$, and ethylene carbonate.

While not required in all aspects, the polymer electrolyte composition for a dye-sensitized solar cell according to an embodiment of the present invention includes at least two electrolytes in different phases. The polymer electrolyte composition according to aspects of the present invention suppresses the volatilization of liquid electrolyte through oxidation/reduction and increases the photoelectric conversion efficiency and the lifetime of the solar cell.

An embodiment of the present invention provides a dye-sensitized solar cell including: first and second electrodes facing each other; a dye-adsorbed porous film interposed between the first and second electrolytes; and a polymer electrolyte obtained by the polymerization of the above-described polymer electrolyte composition.

Due to the use of the polymer electrolyte between the first and second electrodes, the dye-sensitized solar cell according to aspects of the present invention, provides higher energy conversion efficiency than conventional dye-sensitized solar cells. In addition, due to the suppressed volatilization of a solvent in the polymer electrolyte, the dye-sensitized solar cell has stable photoelectric chemical properties against environmental changes, such as a rise in the external temperature of the solar cell.

According to another aspect of the present invention, there is provided a method of manufacturing a dye-sensitized solar cell, the method including: preparing a first electrode and forming a porous film on an upper surface of the first electrode; defining a cell space by covering the porous film with glass disposed a predetermined distance above the porous film; injecting a polymer electrolyte composition including a mono-functional or a multi-functional monomer having at least one ethylene glycol in a side chain, a photoinitiator, a lithium salt, and an organic solvent into the cell space between the porous film and the glass and polymerizing the polymer electrolyte composition to obtain a polymer electrolyte; removing the glass and forming a second electrode a predetermined distance above the porous film and the polymerized polymer electrolyte; and forming a fine hole in the second electrode and injecting a liquid electrolyte through the fine hole.

While not required in all aspects, the first electrode can be a product obtained by coating a conductive film containing at least one of indium tin oxide, indium oxide, tin oxide, zinc oxide, sulfur oxide, fluorine oxide, and a combination thereof, on a transparent plastic substrate including at least one of polyethylene terephthalate (PET), polyethylene naphthalate (PEN), polycarbonate (PC), polypropylene (PP), polyimide (PI), and triacetate cellulose (TAC), or a glass substrate.

While not required in all aspects, the porous film 23 includes nano-sized particles uniformly distributed to provide porosity and suitable surface roughness. The porous film 23 may be formed of a metallic material, such as Ti, Zr, Sr, Zn, In, Yr, La, V, Mo, W, Sn, Nb, Mg, Al, Y, Sc, Sm, Ga, SrTi, etc. The porous film 23 may further include conductive particles, such as indium tin oxide (ITO), to facilitate the movement of electrons. Alternatively, the porous film 23 may further include an optical scatterer to provide an extended optical path and improved efficiency. Alternatively, the porous film 23 may further include both conductive particles and an optical scatterer.

While not required in all aspects, the dye adsorbed on the porous film can be a material containing a Ru complex and absorbs visible light. Ru is an element which belongs to the platinum group and can form various organic metal composites. Examples of Ru composites include metal composites containing Al, Pt, Pd, Eu, Pb, Ir, etc. Examples of commonly available dyes include N3dye[cis-bis(isothiocyanato)bis(2,2'-bipyridyl-4,4'-dicarboxylato)-ruthenium(II)], N719dye [cis-bis(isothiocyanato)bis(2,2'-bipyridyl-4,4'-dicarboxylato)-ruthenium(II)-bis tetrabutylammonium]), etc.

The availability of inexpensive organic colorants of various colors that have various applications and provide high efficiency is currently being researched. Examples of such organic colorants include Cuemarine, pheophorbide a, which is a kind of porphyrin, etc., which can be used alone or in combinations with a Ru composite to improve the absorption of long-wavelength visible light and efficiency.

Such a dye is spontaneously adsorbed onto the porous film in about 12 hours after the porous film is immersed in an alcoholic solution in which the dye is dissolved.

While not required in all aspects, the second electrode can be a product obtained by coating a first conductive film on a transparent plastic substrate including at least one of PET, PEN, PC, PP, PI, and TAC, or a glass substrate and coating a second conductive film including Pt or a precious material on the first conductive film. While not required in all aspects, in an embodiment of the present invention, Pt is used due to high reflectivity.

While not required in all aspects, the first and second electrodes are bound together using a support, such as an adhesive film, a thermoplastic polymer film, for example, SURLYN®, etc., so that the space between the first and second electrodes is sealed. A fine hole is formed through the first or second electrode, an electrolyte solution is injected into the space between the first and second electrodes through the fine hole, and the fine hole is blocked using an adhesive to seal the space.

While not required in all aspects, instead of using the support, an adhesive, such as an epoxy resin, a UV curable agent, etc., is used to directly bind the first and second electrodes and seal the space. In this case, a curing process is also performed after a heat treatment or a UV treatment.

While not required in all aspects, the polymer electrolyte according to the present invention can be used in a cell using a polymer electrolyte, in addition to a dye-sensitized solar cell.

Hereinafter, aspects of the present invention will be described in more detail with reference to the following examples and comparative examples. The following examples and comparative examples are for illustrative purposes only and are not intended to limit the scope of the present invention.

EXAMPLE

A glass substrate coated with a fluorine-containing tin oxide (FTO) was prepared as a first electrode. Next, a $TiO_2$ layer having a thickness of about 18 μm was formed on the first electrode using a doctor blade method, thermally treated at 450° C. for 30 minutes, and immersed in a dye solution of 0.3 mM Ru(4,4'-dicarboxy-2,2'-bipyridine)$_2$(NCS)$_2$ in ethanol for 24 hours or longer to allow dye adsorption.

Figure 3:
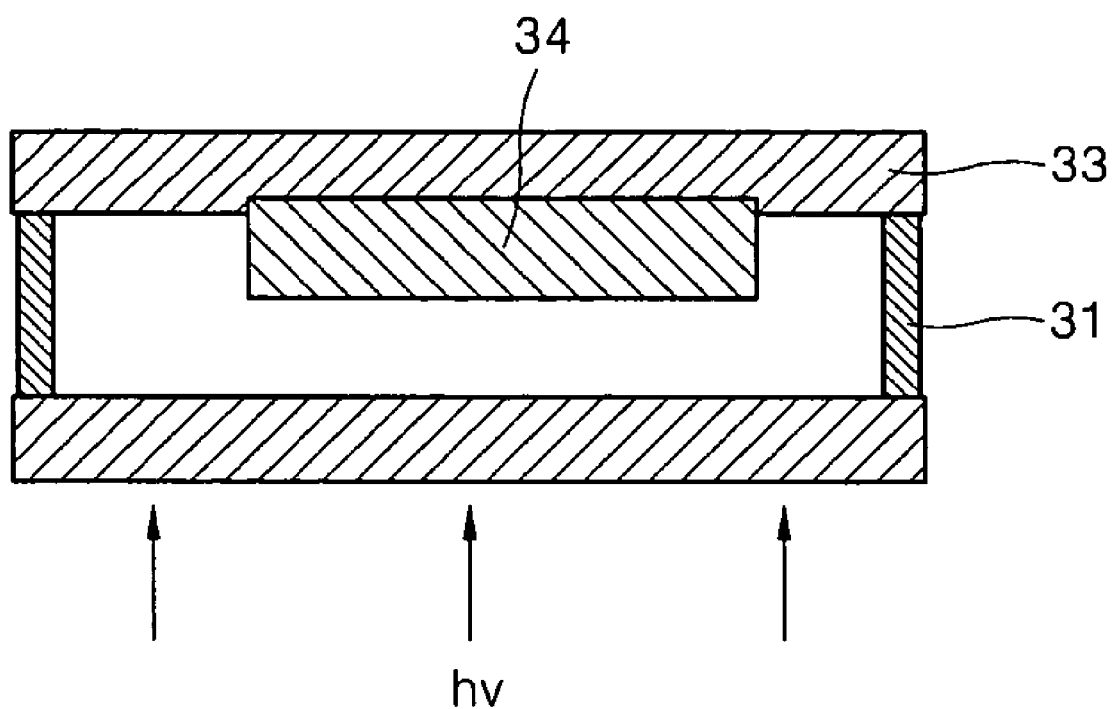
FIG. 3 is a schematic view illustrating polymerization in a dye-sensitized solar cell according to an aspect of the present invention.

FIG. 3 is a schematic view illustrating polymerization in the porous film. A sandwich-like cell structure was manufactured by covering the dye-adsorbed $TiO_2$ layer 33 having an area of 0.25 cm$^2$ with glass while a spacer 31 having a thickness of 25 μm was disposed between the dye-adsorbed $TiO_2$ layer and the glass.

A polymer electrolyte composition containing 4.5 parts by weight of di(ethylene glycol)-2-ethyl hexyl ether acrylate as a monomer, 0.09 parts by weight of benzoin ethyl ether as a photoinitiator, 4.33 parts by weight of $LiClO_4$ as a lithium salt, and 0.45 parts by weight of ethylene carbonate as a plasticizer was prepared.

The polymer electrolyte composition was injected between the $TiO_2$ layer 33 and the glass and irradiated using a Xenon lamp (ORIEL, 300 W, 10 mW/cm$^2$) as a light source through the glass to induce photopolymerization. After the polymerization, the sandwich-like cell structure was dissembled to remove an excess of the polymer, and the cell was washed with ethanol. Here, the first electrode had a structure of poly-diethylene glycol-2-ethyl hexyl ether acrylate (PDEA)/dye/$TiO_2$ electrode.

Figure 4A:
FIGS. 4A through 4C are field emission scanning electron microscope (FE-SEM) photographs of a dye-sensitized solar cell manufactured in Example according to aspects of the present invention.
Figure 4B:
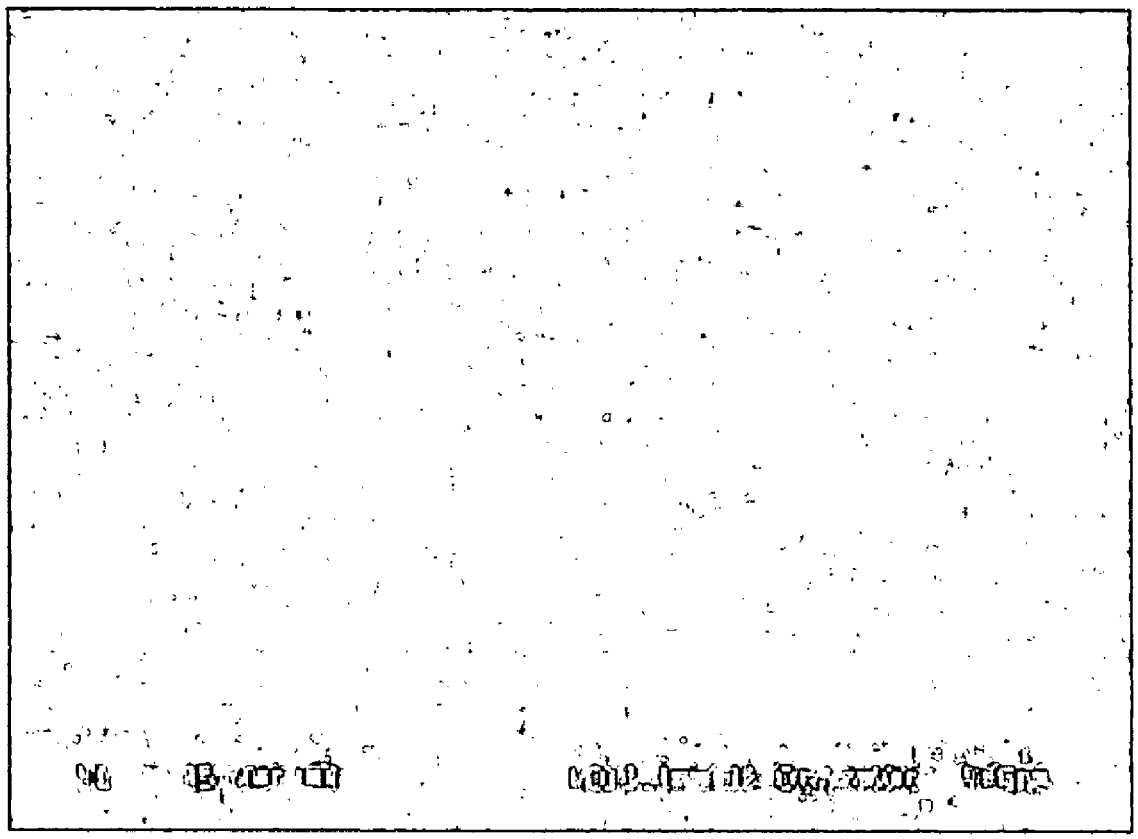
Figure 4C:
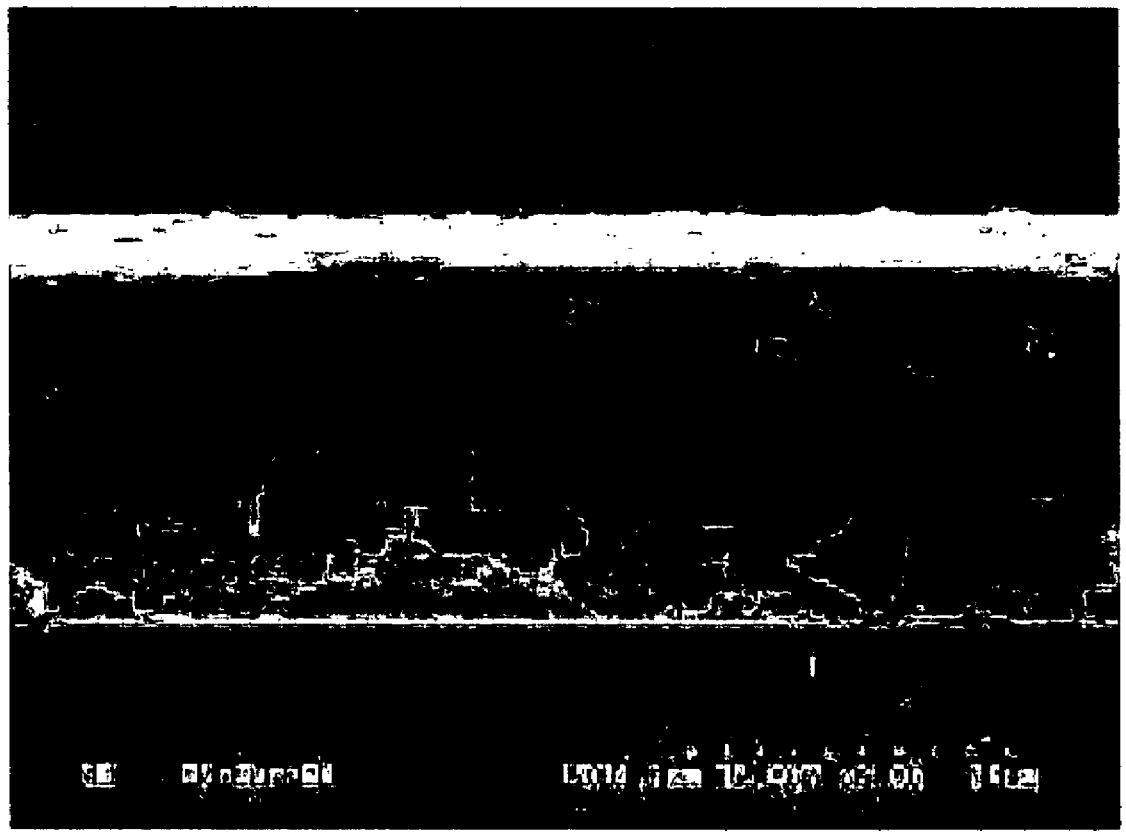
Figure 5:
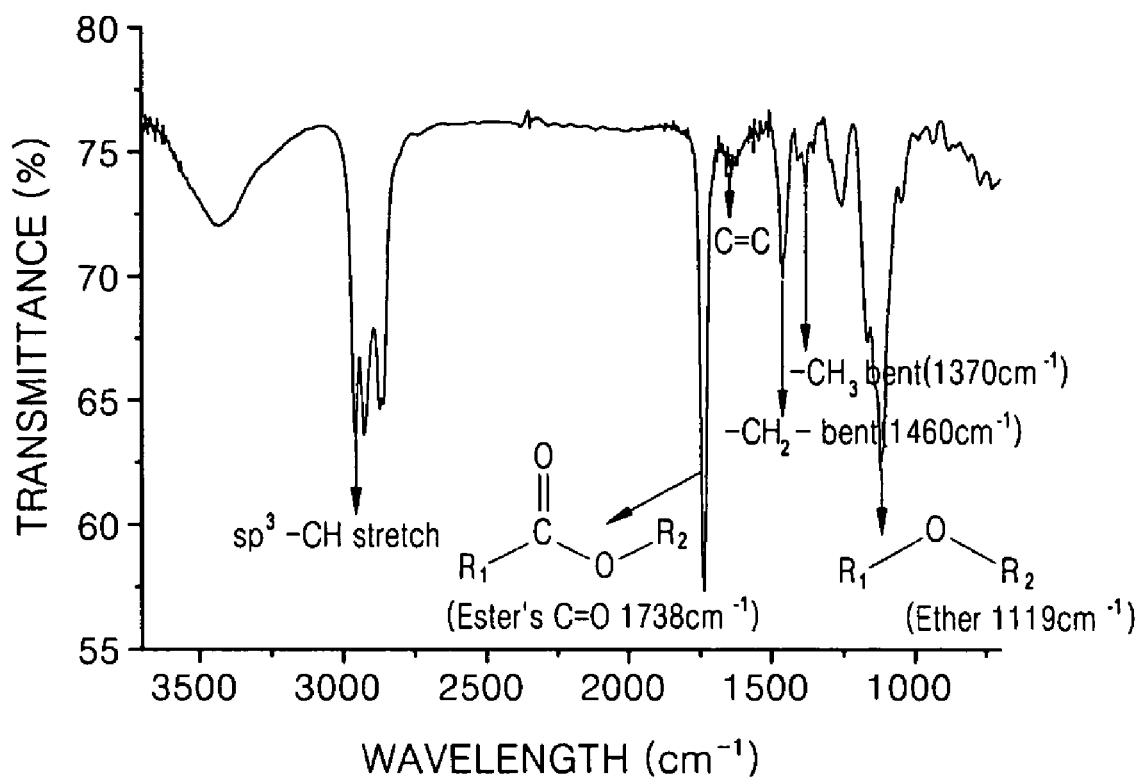
FIG. 5 is an infrared (IR) spectrum of the dye-sensitized solar cell manufactured in Example according to aspects of the present invention.

FIGS. 4A, 4B, and 4C are photographs of cross-sections of $TiO_2$ layers obtained through an FE-SEM analysis after coating with the polymer. FIG. 5 is an IR spectrum of the dye-sensitized solar cell manufactured in Example.

Next, a second electrode was manufactured by depositing a Pt electrode on a transparent, indium-doped tin oxide (ITO) conductor through spin coating. A fine hole for electrolyte injection was formed in the second electrode. Next, the first electrode having the structure of PDEA/dye/$TiO_2$ and the Pt counter electrode, i.e., the second electrode, were thermally pressed to bind together with a thermoplastic polymer film. A redox electrolyte was injected through the fine hole in the second electrode, and the fine hole was sealed using a thermoplastic polymer film, thereby resulting in a complete dye-sensitized solar cell.

The redox electrolyte used was prepared by dissolving 0.6 M 1-hexyl-2,3-dimethyl imidazolium iodide, 0.1M lithium iodide, 0.05M 4-tert-butyl pyridine in 3-methoxypropiononitrile solvent.

The short current, open voltage, fill factor (FF), efficiency, etc., of the dye-sensitized solar cell manufactured in Example were read from a current-voltage curve obtained using a light source having an intensity of 100 mW/cm$^2$ and a Si standard cell.

COMPARATIVE EXAMPLE

A glass substrate coated with a fluorine-containing tin oxide (FTO) was prepared as a first electrode. Next, a $TiO_2$ layer having a thickness of about 18 μm was formed on the first electrode using a doctor blade method, thermally treated at 450° C. for 30 minutes, and immersed in a dye solution of 0.3 mM Ru(4,4'-dicarboxy-2,2'-bipyridine)$_2$(NCS)$_2$ in ethanol for 24 hours or longer to allow dye adsorption.

Next, a second electrode was manufactured by depositing a Pt electrode on a transparent, indium-doped tin oxide (ITO) conductor through spin coating. A fine hole for electrolyte injection was formed in the second electrode. Next, the first electrode having the structure of PDEA/dye/$TiO_2$ and the Pt counter electrode, i.e., the second electrode, were thermally pressed to bind together with a thermoplastic polymer film. A redox electrolyte was injected through the fine hole in the second electrode, and the fine hole was sealed using a thermoplastic polymer film, thereby resulting in a complete dye-sensitized solar cell. The same electrolyte used in Example above was used as the redox electrolyte in the Comparative Example.

The short current (Jsc), open voltage (Voc), fill factor (FF), efficiency, etc., of the dye-sensitized solar cell manufactured in Comparative Example were read from a current-voltage curve obtained using a light source having an intensity of 100 mW/cm$^2$ and a Si standard cell.

Table 1 is the results of comparing the characteristics of the dye-sensitized solar cells manufactured in Example and Comparative Example.

TABLE 1

|  | Current | Voltage | Fill Factor (FF) | Efficiency |
| --- | --- | --- | --- | --- |
| Example | 10.4 | 0.75 | 0.63 | 4.9 |
| Comparative Example | 7.5 | 0.7 | 0.76 | 4.0 |

As described above, the dye-sensitized solar cell according to an embodiment of the present invention includes a polymer electrolyte and a liquid electrolyte between the first and second electrodes. The dye-sensitized solar cell according to Example provides improved energy conversion efficiency over the conventional dye-sensitized solar cell.

The dye-sensitized solar cell according to an embodiment of the present invention has a larger Jsc value than the conventional dye-sensitized solar cell for the following reason. According to references [Ana F Nogueira, Durrant J. R and Marco A De Paoli., Adv. Mater. 13 (2001) 826 and Ana F Nogueira, Marco A De Paoli., Montanari I, Monkhouse R, Nelso J and Durrant J R, J. Phys. Cem. B, 105 (2001) 7517], ionic mobility is expected to decrease in a PDEA-filled $TiO_2$ layer. In addition, low ionic mobility leads to a lower photocurrent by suppressing the reaction between dye cations and $I^-$ ions.

Figure 6:
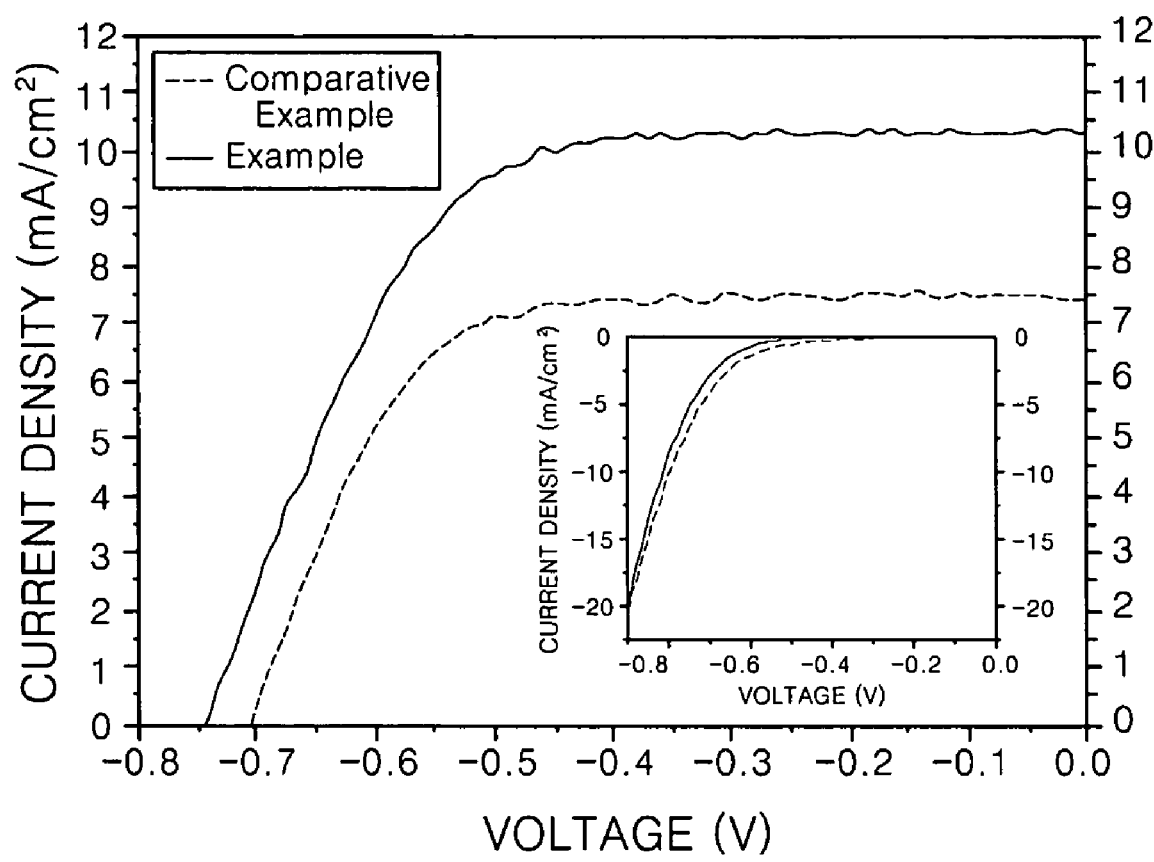
FIG. 6 is a current density-voltage (J-V) curve of the dye-sensitized solar cell manufactured in Example according to aspects of the present invention and a dye-sensitized solar cell manufactured in Comparative Example

However, referring to FIG. 6, which is a J-V curve of the dye-sensitized solar cell manufactured in Example according to aspects of the present invention, the photocurrent increases in the cell with the PDEA-filled $TiO_2$ layer, indicating that the PDEA-filled $TiO_2$ layer does not affect the ionic mobility and just holds the $I_3^{-1}/I^{-1}$ electrolyte like a sponge.

Figure 7:
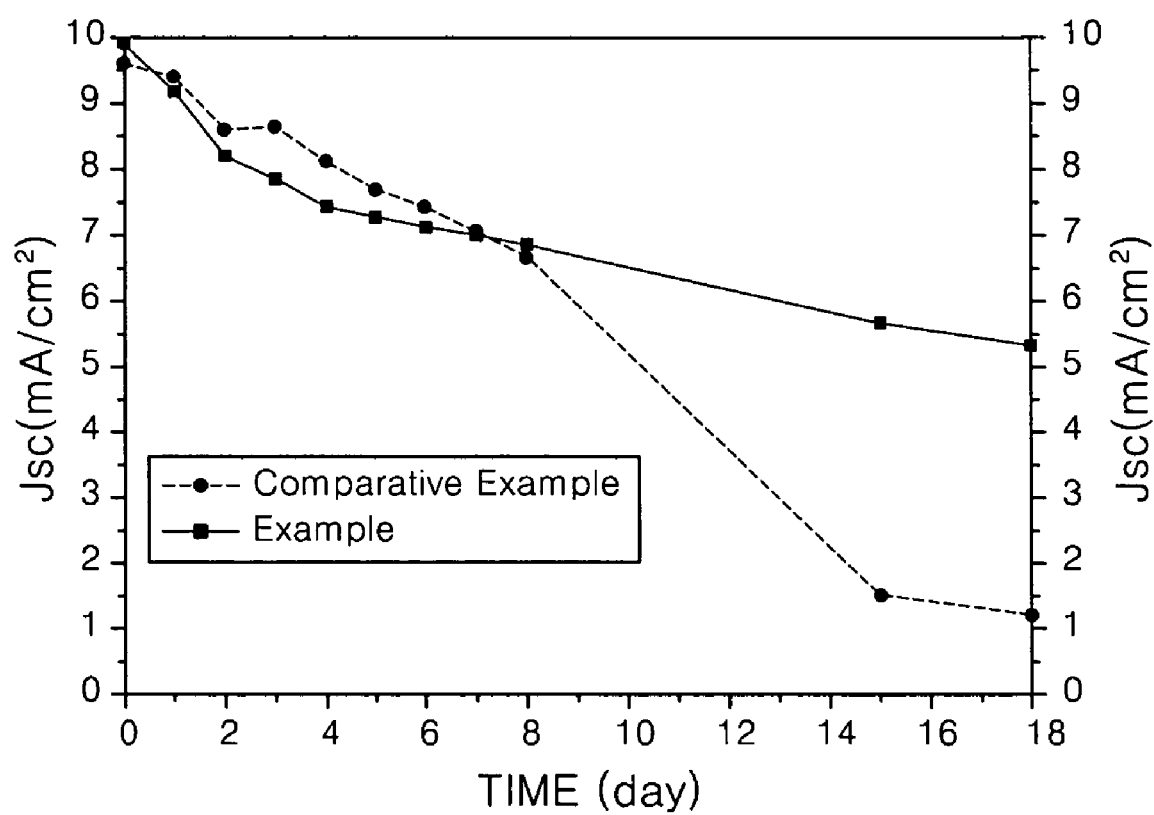
FIG. 7 is a graph of current density (Jsc) versus time of the dye-sensitized solar cell manufacture in Example according to aspects of the present invention and the dye-sensitized solar cell manufactured in Comparative Example.
Figure 8:
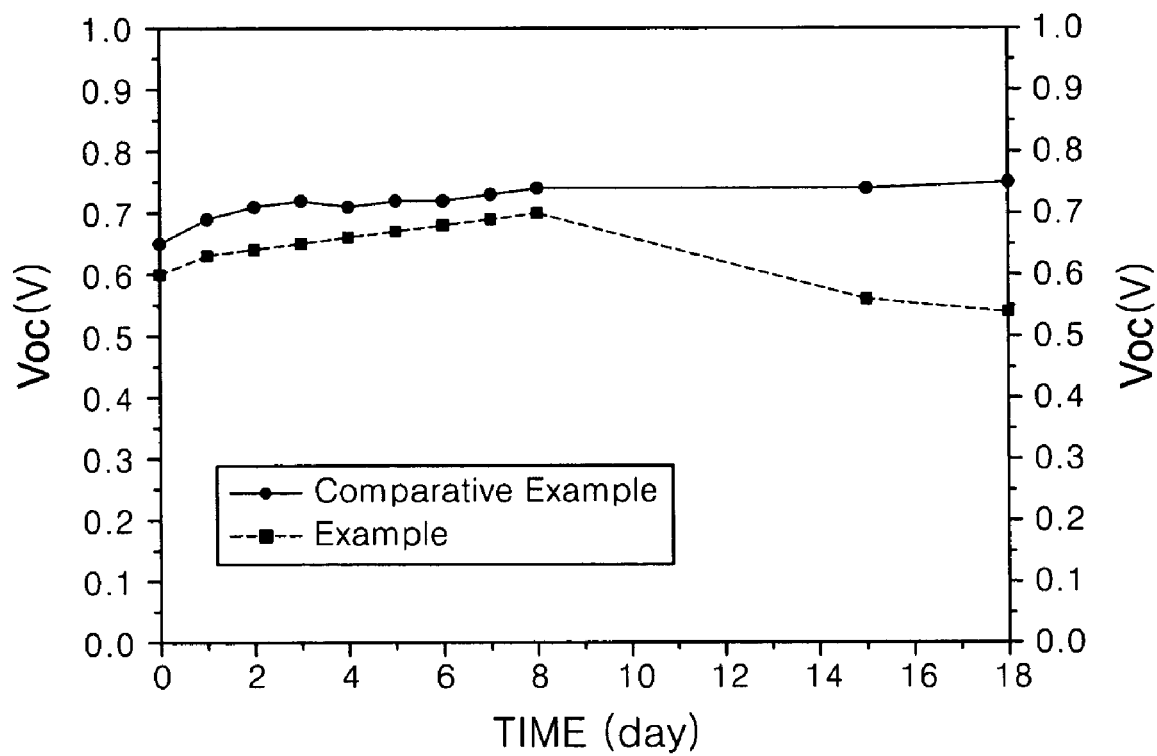
FIG. 8 is a graph of voltage (Voc) versus time of the dye-sensitized solar cell manufactured in Example according to aspects of the present invention and the dye-sensitized solar cell manufactured in Comparative Example.

This characteristic affects the lifetime of the cell. FIGS. 7 and 8 are respectively, a graph of current versus time and a graph of voltage versus time of the dye-sensitized solar cell manufactured in Example according to aspects of the present invention, obtained through daily cell efficiency measurements over 18 days.

Referring to FIG. 7, the current decreases faster in the conventional cell than in the PDEA-filled cell. This is because PDEA reduces the leakage of the redox electrolyte in the cell.

Referring to FIG. 8, the voltage of the PDEA-filled cell according to an embodiment of the present invention, is higher than the voltage of the conventional cell. The presence of more electrons in the PDEA-filled $TiO_2$ layer than in the conventional cell can be confirmed through electrochromic characteristics of a $TiO_2$ layer in a $Li^+$-containing solution.

Figure 9:
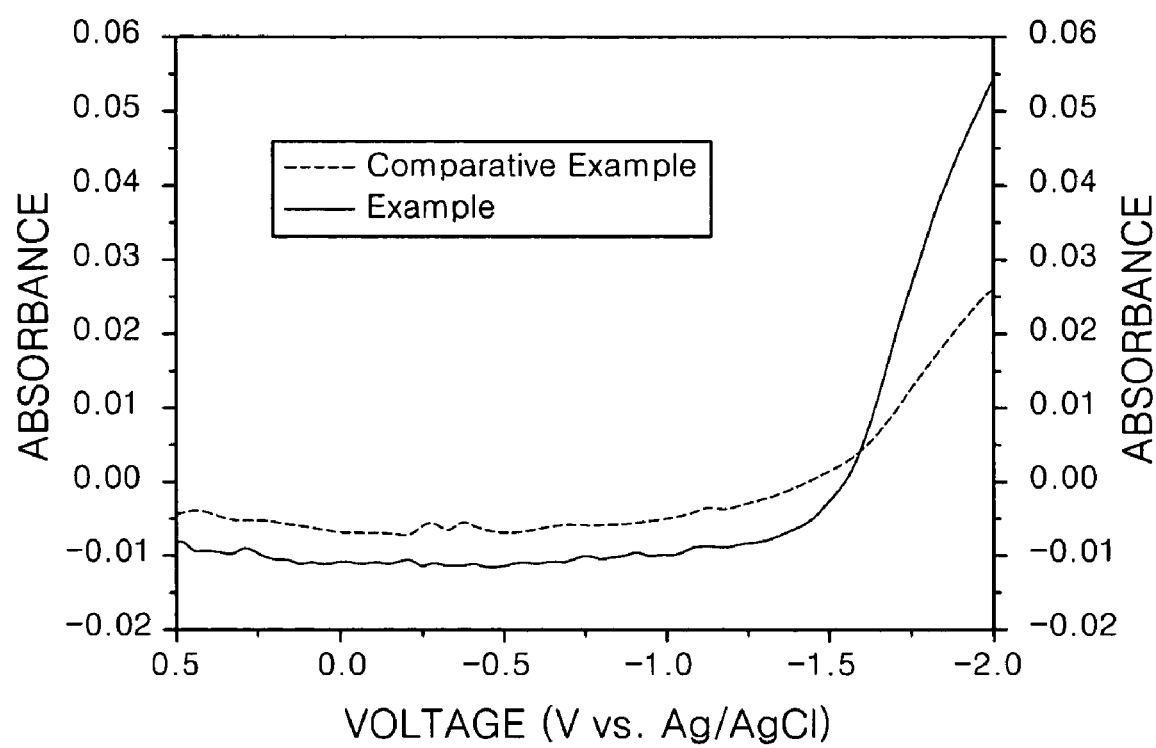
FIG. 9 is a graph of absorbance at 800 nm of the dye-sensitized solar cell manufactured in Example according to aspects of the present invention and the dye-sensitized solar cell manufactured in Comparative Example.

Referring to FIG. 9, the absorbance of the PDEA-filled cell according to an embodiment of the present invention, is greater than the absorbance of the conventional cell at a negative potential of a flat band potential (Vfb) or less, indicating that the PDEA-filled $TiO_2$ layer contains more free electrons than the conventional cell.

As described above, according to aspects of the present invention, the volatilization of the solvent of the polymer electrolyte is minimized, and thus stable photoelectrochemical characteristics against environmental changes, such as a rise in the external temperature of the solar cell, can be obtained. In addition, a highly efficient dye-sensitized solar cell with a higher voltage can be manufactured.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A polymer electrolyte composition for a dye-sensitized solar cell, the composition comprising:
   di(ethylene glycol) 2-ethylhexyl ether acrylate;
   a photoinitiator; and
   a lithium salt.

2. The polymer electrolyte composition of claim 1, wherein the amount of the di(ethylene glycol) 2-ethylhexyl ether acrylate is in a range that is at or between 1 and 10 parts by weight, based on 100 parts by weight of the polymer electrolyte composition.

3. The polymer electrolyte composition of claim 1, wherein the photoinitiator is at least one selected from the group consisting of benzoylperoxide, azobisisobutyronitrile, benzophenone, acetophenone, benzoin methyl ether, and benzoin ethyl ether.

4. The polymer electrolyte composition of claim 1, wherein the amount of the photoinitiator is in a range that is at or between 0.05 and 0.2 parts by weight based on 100 parts by weight of the polymer electrolyte composition.

5. The polymer electrolyte composition of claim 1, wherein the lithium salt is one selected from the group consisting of $LiPF_6$, $LiClO_4$, $LiBF_4$, $LiCF_3SO_3$, $LiN(CF_3SO_2)_2$, $LiC(CF_3SO_2)_3$, LiSCN, $LiSbF_6$, $LiAsF_6$, and a combination of two or more.

6. The polymer electrolyte composition of claim 1, wherein the concentration of the lithium salt is in a range that is at or between 0.4 and 1.5M.

7. The polymer electrolyte composition of claim 1, further comprising a plasticizer selected from the group consisting of ethylene carbonate and propylene carbonate.

8. The polymer electrolyte composition of claim 1, wherein photoinitiator, $LiClO_4$ is the lithium salt and the polymer electrolyte composition further comprises ethylene carbonate as a plasticizer and does not contain an organic solvent.

9. A polymer electrolyte for a dye-sensitized solar cell that is obtained by polymerizing the polymer electrolyte composition of claim 1.

10. A polymer electrolyte for a dye-sensitized solar cell that is obtained by polymerizing the polymer electrolyte composition of claim 2.

11. A polymer electrolyte for a dye-sensitized solar cell that is obtained by polymerizing the polymer electrolyte composition of claim 3.

12. A polymer electrolyte for a dye-sensitized solar cell that is obtained by polymerizing the polymer electrolyte composition of claim 4.

13. A polymer electrolyte for a dye-sensitized solar cell that is obtained by polymerizing the polymer electrolyte composition of claim 5.

14. A polymer electrolyte for a dye-sensitized solar cell that is obtained by polymerizing the polymer electrolyte composition of claim 6.

15. A polymer electrolyte for a dye-sensitized solar cell that is obtained by polymerizing the polymer electrolyte composition of claim 7.

16. A polymer electrolyte for a dye-sensitized solar cell that is obtained by polymerizing the polymer electrolyte composition of claim 8.

17. The polymer electrolyte of claim 9, further comprising a liquid electrolyte.

18. The polymer electrolyte of claim 17, wherein the liquid electrolyte comprises a second lithium salt or a second organic solvent.

19. A method of manufacturing a dye-sensitized solar cell, the method comprising:
   preparing a first electrode and forming a porous film on a surface of the first electrode;
   defining a cell space by covering the porous film with a glass disposed a predetermined distance from the porous film;
   injecting a polymer electrolyte composition including di(ethylene glycol) 2-ethylhexyl ether acrylate, a photoinitiator, and a lithium salt into the cell space between the porous film and the glass and polymerizing the polymer electrolyte composition to obtain a polymer electrolyte;

removing the glass and forming a second electrode a predetermined distance from the porous film and the polymerized polymer electrolyte; and forming a fine hole in the second electrode and injecting a liquid electrolyte through the fine hole.

20. A dye-sensitized solar cell comprising:
first and second electrodes facing each other;
a dye-adsorbed porous film interposed between the first and second electrodes; and
a polymer electrolyte interposed between the first and second electrodes, the polymer electrolyte obtained by polymerizing a polymer electrolyte composition comprising di(ethylene glycol) 2-ethylhexyl ether acrylate, a photoinitiator, and a lithium salt.

21. The dye-sensitized solar cell of claim 20, wherein the amount of the di(ethylene glycol) 2-ethylhexyl ether acrylate is in a range that is at or between 1 and 10 parts by weight, based on 100 parts by weight of the polymer electrolyte composition.

22. The dye-sensitized solar cell of claim 20, wherein the photoinitiator is at least one selected from the group consisting of benzoylperoxide, azobisisobutyronitrile, benzophenone, acetophenone, benzoin methyl ether, and benzoin ethyl ether.

23. The dye-sensitized solar cell of claim 20, wherein the amount of the photoinitiator is in a range that is at or between 0.05 and 0.2 parts by weight, based on 100 parts by weight of the polymer electrolyte composition.

24. The dye-sensitized solar cell of claim 20, wherein the lithium salt is one selected from the group consisting of $LiPF_6$, $LiClO_4$, $LiBF_4$, $LiCF_3SO_3$, $LiN(CF_3SO_2)_2$, $LiC(CF_3SO_2)_3$, $LiSCN$, $LiSbF_6$, $LiAsF_6$, and a combination thereof.

25. The dye-sensitized solar cell of claim 20, wherein the concentration of the lithium salt is in a range that is at or between 0.4 and 1.5 M.

26. The dye-sensitized solar cell of claim 20, wherein the polymer electrolyte composition further comprises a plasticizer selected from the group consisting of ethylene carbonate and propylene carbonate.

27. The dye-sensitized solar cell of claim 20, wherein the benzoin ethyl ether is the photoinitiator $LiClO_4$ is the lithium salt and the polymer electrolyte composition further comprises ethylene carbonate as a plasticizer, and does not contain an organic solvent.

28. The dye-sensitized solar cell of claim 20, further comprising a liquid electrolyte.

29. The dye-sensitized solar cell of claim 20, further comprising a second lithium salt.

* * * * *

UNITED STATES PATENT AND TRADEMARK OFFICE
CERTIFICATE OF CORRECTION

PATENT NO. : 7,592,540 B2 Page 1 of 1
APPLICATION NO. : 11/433462
DATED : September 22, 2009
INVENTOR(S) : Joung-Won Park et al.

It is certified that error appears in the above-identified patent and that said Letters Patent is hereby corrected as shown below:

Column 10, line 20, before "photoinitiator" insert --benzoin ethyl ether is the--;
Column 10, line 20, change "salt" to --salt,--.

Column 12, line 5, change "$LiCF_3SO_3$" to --$LiCF_3SO_3$,--;
Column 12, line 17, change "salt" to --salt,--.

Signed and Sealed this

Twelfth Day of January, 2010

David J. Kappos
*Director of the United States Patent and Trademark Office*